US006365279B1

(12) United States Patent
De Meutter et al.

(10) Patent No.: US 6,365,279 B1
(45) Date of Patent: Apr. 2, 2002

(54) FUSING MEMBER FOR HOT PRESSURE FIXING OF TONER PARTICLES AND FOR TRANSFUSING TONER PARTICLES

(75) Inventors: Stefaan De Meutter, Antwerpen; Serge Tavernier, Lint; Danny Van Wunsel, Westerlo, all of (BE)

(73) Assignee: Xeikon N.V., Mortsel (BE)

( * ) Notice: Subject to any disclaimer, the term of this patent is extended or adjusted under 35 U.S.C. 154(b) by 0 days.

(21) Appl. No.: 09/461,368

(22) Filed: Dec. 15, 1999

Related U.S. Application Data

(60) Provisional application No. 60/122,358, filed on Mar. 2, 1999.

(30) Foreign Application Priority Data

Dec. 21, 1998 (EP) .......................................... 98204368

(51) Int. Cl.[7] ............................ B32B 9/04; B32B 7/02; G03G 15/20

(52) U.S. Cl. ....................... 428/447; 428/448; 428/215; 428/323; 399/320; 399/329; 399/333

(58) Field of Search ................................ 428/428, 429, 428/447, 448; 399/320, 333

(56) References Cited

U.S. PATENT DOCUMENTS

| | | | | | |
|---|---|---|---|---|---|
| 5,960,245 | A | * | 9/1999 | Chen et al. | 399/333 |
| 5,966,578 | A | * | 10/1999 | Soutome et al. | 399/333 |
| 6,063,463 | A | * | 5/2000 | Schlueter, Jr. et al. | 428/36.91 |
| 6,159,588 | A | * | 12/2000 | Eddy et al. | 428/215 |

* cited by examiner

*Primary Examiner*—Robert Dawson
*Assistant Examiner*—Michael J Feely
(74) *Attorney, Agent, or Firm*—Knobbe, Martens, Olson & Bear LLP

(57) ABSTRACT

A fusing member comprising a support, and on the support, an outermost layer containing a silicone elastomer, having at most 5% by weight of filler particles, the elastomer layer containing polyorganosiloxane having a swelling factor, SF, equal to or higher than 3 and a thickness between 5 and 500 $\mu$m, both limits included and a second layer with an impurity absorbing material, closer to the support and immediately in contact with the outermost layer, the second layer being at least 40 $\mu$m thick. Preferably the second layer has a silicone containing elastomer and contains at least 5% by weight of metal oxide particles having a specific surface of $\geqq 30$ $m^2$.

22 Claims, No Drawings

FUSING MEMBER FOR HOT PRESSURE FIXING OF TONER PARTICLES AND FOR TRANSFUSING TONER PARTICLES

This application claims benefit of Prov. No. 60/122,358 filed Mar. 2, 1999.

FIELD OF THE INVENTION

This invention relates to a member that can be used as a fusing roller for hot pressure fixing of toner particles or as an intermediate member in transfuse systems. It relates in particular to such a roller with specified elastomeric layers, in particular silicone rubbers.

BACKGROUND OF THE INVENTION

In electro(photo)graphic copiers or printers, the toner image formed on the photoconductor can be transferred directly to the final image receiver, e.g. plain paper whereon it is fixed by fusing the toner particles by heat and pressure using fixing rollers. The toner image formed on the photoconductor or brought on a means for collecting the colour separations when performing colour printing, can be transferred not directly to the final image receiving member but in a first transfer zone to an intermediate member that can be heated and from that intermediate member to the final image receiving member whereon it is fixed by the heating of the intermediate member that is pressed against the final image receiving member by a pressure means. This latter process is further on termed as a "transfuse" and the intermediate member is designated by "transfusing member".

Fusing and fixing of toner particles to a substrate by simultaneous application of heat and pressure are well known in the art and also fusing rollers for use in hot pressure fixing of toner particles are well known.

In, e.g., U.S. Pat. No. 4,078,286 a fusing roller is disclosed with a base member and thereon a first layer of an heat resistant resin and on top of the first layer a layer of silicone rubber.

In U.S. Pat. No. 4,257,699 and its equivalent EP-A_018 140 a fuser member with a base material and two elastomer layers thereon, the outer elastomer layer containing a metal filler is disclosed. In U.S. Pat. No. 5,049,444 a multi-layered fusing member is disclosed. This member has in sequential order a base support member, an adhesive layer, a tie coat layer and an outer elastomeric fusing layer with therein a copolymer with vinylidene fluoride and a metal oxide.

Also transfusing members are well known in the art. When transfusing members are in contact with the photoconductor it is important that the photoconductor is not soiled by impurities present in the final imaging member. Therefore transfusing members comprising two layers, a top layer permeable for the impurities and a layer under the top layer absorbing the impurities have been disclosed. In, e.g., EP-A-146 980 a transfusing member is described consisting of a metal roller provided with a first covering of pigmented RTV silicone rubber (RTV201/200, wherein silica particles are present) and a second covering of non-pigmented silicone rubber obtained by cross-linking an α,ω-hydroxy-polymethylsiloxane with a tetra-ethyl silicate under influence of di-butyl tin dilaurate.

In EP-A-581 365 a transfusing member is disclosed consisting of a support with a pigmented rubber layer, wherein the pigment is preferably carbon black, and a top layer of silicone rubber.

In most of the applications of both a fusing roller and a transfusing member, a release agent, most frequently a silicone oil, is applied to the fusing or transfusing members to prevent hot-offset (i.e. toner particles adhering to the surface of the fusing or transfusing members instead of to the substrate) and to enhance the lifetime of the surface of the fusing and transfusing members.

The use of a release agent can however create problems in the finished image, basically because it gives kind of gloss to the image and that, when the release agent is not evenly spread over the image differences in gloss appear. Thus the use of release agents frequently entails problems of streaks, oily look, patchiness, etc. in the finished image. When silicone oil is applied to a transfusing member that comes in direct contact with the photoconductor, the photoconductor can be soiled by the silicone oil and therefore it is important that the use external release agent can be minimised or preferably avoided.

It has been proposed, for avoiding hot-offset when using a low amount of release agent, to change the properties of the toner particles, especially the type of toner resin that is used. Such toner particles have been disclosed in, e.g., EP-A-712 881 and EP-A-740 217. These measures do indeed offer the possibility of hot-pressure fixing even when using very low amounts of release agent, but because of the need to use special toner resins, the degrees of freedom in toner design, e.g., with respect to mechanical strength, chargeability, etc., are diminished.

Therefore the need for fusing and/or transfusing members that can be used, when only small amounts of release agent is used, is still there.

OBJECTS AND SUMMARY OF THE INVENTION

It is an object of this invention to provide a fusing member that can be used in hot-pressure fixing of toner particles to a substrate while avoiding the use of substantial amounts of release agents on the surface of the fusing member.

It is a further object of the invention to provide a fusing member that can be used in hot-pressure fixing of toner particles to a substrate while avoiding the use of substantial amounts of release agents on the surface of the fusing member that can be for a very long time preparing a large amount of prints before hot-offset appears.

It is an other object of the invention to provide a method for hot-pressure fixing of toner particles wherein only small amounts of release agent are applied to the fusing roller.

Further objects and advantages of the invention will become clear from the detailed description hereinafter.

The objects of the invention are realised by providing a fusing member comprising a support, and on said support,

- an outermost layer containing a silicone elastomer, with at most 5% by weight of filler particles, said elastomer layer having a swelling factor, SF, equal to or higher than 3 and a thickness between 5 and 500 $\mu$m, both limits included and
- a second layer with an impurity absorbing material, closer to said support and immediately in contact with said outermost layer, said second layer being at least 40 $\mu$m thick. Preferably said second layer has silicone containing elastomer and contains at least 5% by weight of metal oxide particles having a specific surface of $\geqq 30$ $m^2$.

The objects of the invention are further realised by providing an imaging method comprising the steps of:

- image-wise applying toner particles to a substrate and
- fixing said toner particles to said substrate by simultaneous application of heat and pressure, characterised in that:

said fixing proceeds in a fusing system wherein a fusing member is present comprising a support, and on said support, an outermost layer containing a silicone elastomer, with at most 5% by weight of filler particles, said elastomer layer having a swelling factor, SF, equal to or higher than 3 and a thickness between 5 and 500 μm, both limits included and a second layer with an impurity absorbing material, closer to said support and immediately in contact with said outermost layer, said second layer being at least 40 μm thick and that at most 320 $mg/m^2$ of a release agent is applied to the surface of said fusing roller.

DETAILED DESCRIPTION OF THE INVENTION

As described above, during fusing and transfusing a release agent, most frequently a silicone oil, is applied to the fusing or transfusing members to prevent hot-offset (i.e. toner particles adhering to the surface of the members instead of to the substrate) and to enhance the lifetime of the surface of the fusing and transfusing members. In this document the wording "fusing member" will be used to indicate both a fusing member and a transfusing member. It was now found, after experimentation, that it was possible to design a member that could be used as fusing member with a very low amount of external release agent, e.g. silicone oil, or even without any external release agent and still had a long lifetime and did not show hot-offset. Therefore the fusing member, as in the prior art, comprised two layers on a support wherein an outermost layer containing at most 5% by weight of an inorganic filler is in direct contact with a second impurity absorbing layer wherein preferably at least 5% by weight of metal oxide particles are present.

The Outermost Layer

Contrary to the prior art fusing members, however, it was found that the outermost layer of the fusing member according to this invention, had to be quite soft. Whereas in the prior art fusing members, the outermost layer is chosen to be quite hard (e.g. a hardness equal to or larger than 40 Shore A), it was now found that fusing members having an outermost layer, being between 5 and 500 μm thick, with a degree of swelling factor equal to or higher than 3% gave better results in terms of avoiding hot-offset than the harder prior art outermost layers. The swelling factor is in the case of an outermost layer according to this invention an indication of the softness, a layer with a high swelling factor is quite soft. It is preferred that an outermost layer in a fusing member according to this invention has a swelling factor, SF, equal to or larger than 3, more preferably SF≧5.

The swelling factor is measured as follows: The thickness of a self-supporting sample of the outermost layer measuring about 20 mm×3 mm is measured to an accuracy of 0.1 μm. This is the value $Th_d$, standing for dry thickness. Afterwards the self-supporting sample is wetted with toluene and the sample is allowed to swell for 3 minutes, then the excess toluene is wiped and the thickness of the swollen sample is again measured to an accuracy of 0.1 μm. This is the value $Th_w$. The swelling factor, SF, is $Th_w/Th_d$.

Preferably at most 5% by weight of an inorganic filler is added to the outermost layer, more preferably at most 2% by weight of an inorganic filler is added and in an even more preferred embodiment, it no inorganic filler at all is deliberately added to the outermost layer, so that it contain no inorganic filler, except for possible impurities that can be present in the other ingredients of the layer.

Moreover it showed very beneficial to have an outermost layer having a peeling force lower than 5 N/m measured according to the Finat No 3 norm, with Tape TESA 4163 at a peeling speed of 30 cm/min. Thus peeling force is the force necessary to peel a TESA 4163 tape away from the outermost layer at a speed of 30 cm/min.

The outermost layer, which is preferably the outermost layer of the fusing member that comes in direct contact with the toner particles, contains preferably at least 80% by weight of a silicone elastomer (silicone rubber) being loosely cross-linked and forming a kind of network having a low amount of cross-links. The outermost layer may further contain, imbedded in said network a silicone oil with a molecular weight equal to or larger than 50,000. A well suited silicone oil is, e.g., the silicone oil sold by ABCR GmbH, Karlsruhe, Germany under trade name DGM-000. Very well suited elastomers, for forming the outermost layer in a fusing member of this invention, are RTV or loosely cross-linked silicone elastomers formed by poly-addition of a organopolysiloxane with average molecular weight<300,000 and/or an organopolysiloxane gum with average molecular weight>300,000 having an alkenyl group, preferably at least two alkenyl groups, which are preferably vinyl groups. The latter silicone rubbers are preferred. Very preferred silicone rubbers for use in the outermost layer of a fusing member of this invention are silicone rubbers produced by cross-linking of organopolysiloxanes containing more than 0.005 milli-equivalent of vinyl groups per g and less than 0.1 milli-equivalent of vinyl groups per g. More preferably the content of vinyl groups in organopolysiloxanes, useful for forming the outermost layer of a fusing member of this invention, is between 0.005 and 0.05 milli-equivalent of vinyl groups per g. The equivalent value of vinyl groups is calculated by dividing the number of vinyl groups in the organopolysiloxane by the molecular weight of the organopolysiloxane.

The outermost layer can comprise a mixture of organopolysiloxanes with free alkenyl groups. In this case the average alkenyl content of the mixture is preferably between 0.005 milli-equivalent and 0.1 milli-equivalent of vinyl groups per g. More preferably the average content of vinyl groups in such a mixture of organopolysiloxanes, is between 0.005 and 0.05 milli-equivalent of vinyl groups per g. The vinyl groups on the organopolysiloxane can be terminal groups or the vinyl groups can be side groups in the organopolysiloxane. Typical examples of useful organopolysiloxanes are represented by the formulas:

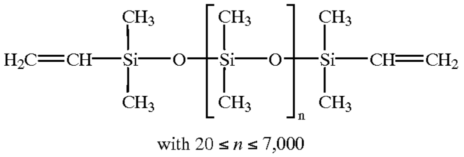

with $20 \leq n \leq 7{,}000$

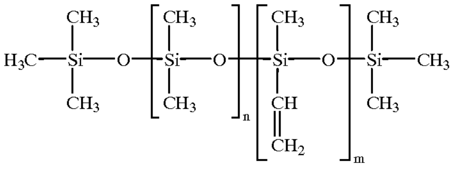

with $20 \leq n \leq 20{,}000$

-continued

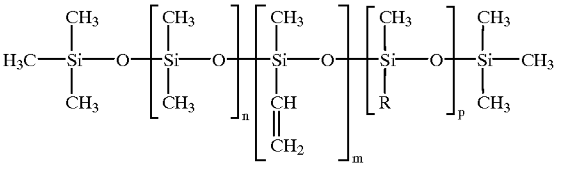

with $20 \leq n \leq 20{,}000$
$2 \leq m \leq 2{,}000$
$1 \leq p \leq 10{,}000$

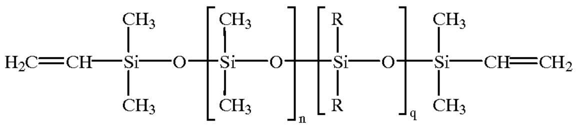

with $20 \leq n \leq 7{,}000$
$1 \leq q \leq 5{,}000$

In these formulas R=alkyl or aryl group, preferably methyl, ethyl, 3,3,3-trifluorpropyl and phenyl.

Organopolysiloxanes with an alkenyl group and with average molecular weight<300,000 are commercially available, e.g., from Rhone-Poulenc under trade name SILCOLEASE 7420, SILCOLEASE 7440, from ABCR, Karlsruhe, Germany under trade name VGM-021. Organopolysiloxane gums with an alkenyl group and with average molecular weight>300,000 commercially available, e.g., from ABCR, Karlsruhe, Germany under trade name DMS-V41, DMS-V46 and VDT-153.

The outermost layers in a fusing member according to this invention are frequently applied from a coating solution by dip-coating or by ring-coating. When doing so it is beneficial to use a mixture of a organopolysiloxane with an alkenyl group and with average molecular weight <300,000 and/or an organopolysiloxane gum with an alkenyl group and with average molecular weight >300,000, since by doing so the viscosity of the coating solution can easily be adjusted for optimum coating quality without using a separate viscosity regulating compound.

The organopolysiloxane with an alkenyl group and with average molecular weight<300,000 and an organopolysiloxane gum with an alkenyl group and with average molecular weight>300,000, forming the outermost layer of a fusing member according to this invention, can be hardened by reaction with an organopolysiloxane containing at least two hydrogen atoms direct bound to a Si-atom per-molecule. When an hardener of this type is used it is added to the coating solution so that between 0.5 to 20 moles of hydrogen atoms direct bound to a Si-atom are present per mole of the alkenyl groups.

Typical examples are:

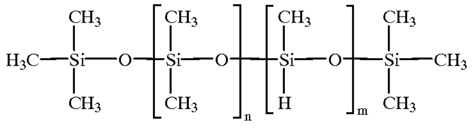

with $0 \leq n \leq 5{,}000$
$2 \leq m \leq 2{,}000$

-continued

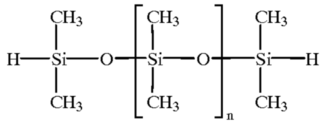

with $0 \leq n \leq 5{,}000$

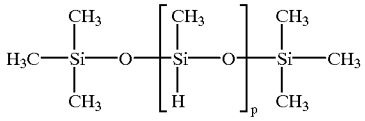

with $0 \leq p \leq 200$

When preparing the outermost layer for a fusing member according to this invention, the cross-linking reaction can be speeded up by addition of a Pt-catalyser in a concentration between 0.1 to 500 ppm with respect to the total amount of organopolysiloxanes.

The outermost layer can comprise further additives, if so desired, e.g. cure retardants, heat stabilisers, flame retardants, plasticisers, anti-static agents, electric conductive compounds, etc.

The Second Layer Immediately in Contact with the Outermost Layer

The second layer comprises preferably at least 80% by weight of a silicone rubber and preferably at least 5% by weight of inorganic filler particles with specific surface of at least 30 $m^2/g$, more preferably said particles have a specific surface of at least 50 $m^2/g$ and even more preferably said particles have a specific surface of at least 100 $m^2/g$. This filler can be $SiO_2$, $TiO_2$, $Al_2O_3$, a pigment as, e.g. Cu-phthalocyanine. In a second layer of the present invention it is preferred that the inorganic filler with specific surface of at least 30 $m^2/g$ is a member selected from the group consisting of $SiO_2$, $TiO_2$, and $Al_2O_3$. Surprisingly, it showed that second layer carbon black as filler, did not work very well when the second layer is combined with a soft outermost layer as is the case in a fusing member of this invention. This is contrary to the disclosure of EP-A-581 365 where a second layer comprising carbon black as filler was most beneficial, when it is combined with a hard outermost layer.

The presence of the filler aids the fusing member to absorb compounds coming from the heated toner particles and/or the heated image receiving member that soil the surface of the fusing member and that penetrate the outermost layer. Thus the surface of the fusing member stays clean for a longer time of use.

The second layer is in a fusing member of this invention mostly used as the layer for transporting the thermal energy needed to fuse the toner particles from a source of heat towards the outermost layer. Therefore the thermal conductivity of the second layer is at least 0.4 W/m.K (measured according to DIN 52612 in Watt per meter times degree Kelvin), preferably the thermal conductivity of the second layer is at least 0.7 W/m.K. The high thermal conductivity is beneficial for cold offset, which means that when the fusing member has a second layer with high thermal conductivity the fusing process of the toner particles starts a lower temperatures. In order to control the thermal conductivity of the second layer in a fusing member according to this invention, this second layer further comprises preferably inorganic filler particles having an average volume diameter of at least 1 μm, this larger filler particles can be silica, CuO, $Fe_2O_3$, $Al_2O_3$ etc.

The Support

The support in a fusing member of the present invention can be any support known in the art. A metal support, e.g. aluminium, stainless steel, etc., are preferred supports.

The support can be in the form of a roller, which can be a hollow metal (e.g. Al, Stainless steel, etc.) cylinder incorporating an heating source or in the form of an endless belt.

If so desired it is possible to include, in a fusing member of this invention, an adhesive layer between the support and the second layer.

The fusing member of this invention can be used in a fusing device as a heated fixing roller coupled to a pressure roller for hot pressure fixing of the toner particles. In this case, the amount of filler that can incorporated in the second layer depends whether the fusing member is used as nip-forming roller or not. When, in such a fixing device, the fusing member of this invention is used as nip-forming roller, then the amount of filler is restricted by the need for having a good elasticity of the nip-forming roller. When in such a fixing device, the pressure roller is used as nip forming roller, more filler can be added to the second layer which makes it possible to have a second layer with high thermal conductivity. It is thus preferred, in a fixing device wherein a fusing member of this invention is coupled, as fixing roller, to a pressure roller for hot pressure fixing of the toner particles that the pressure roller is the nip-forming roller, so that a second layer with high thermal conductivity can be used in the fusing member. Since the fixing roller is the heated roller in the couple fixing roller/pressure roller and it is usually heated from inside the support (which is most frequently an hollow cylinder) a second layer with high thermal conductivity is beneficial for bringing the heat rapidly to the surface of the fixing roller which in turn allows for higher fixing speed.

A fusing member of this invention can also be used as a transfusing member, in this case the toner image present on a photoconductor or on an intermediate member is not directly transferred to a final image receiving substrate and fixed there, but is first transferred to a transfusing member, from where it is further, in one step transferred and fixed to the final image receiving member. An printer using toner particles in a transfuse system is more complicated than a printer wherein direct transfer proceeds, but a transfuse system has the advantage that lower fixing temperature can be used.

In printers with transfusing systems it is often customary to avoid direct contact between the photoconductor and the transfusing member to avoid soiling of the photoconductor, therefore a toner image, developed on the photoconductor is often first transferred to an intermediate member, e.g. a belt or roller made from non-soiling material, as metal or a polymer, and from said intermediate member to the transfuse member. A fusing member of this invention can be used as transfusing member in printers with direct contact between the photoconductor as well as in printers wherein the image is transferred from the photoconductor to the transfusing member over an intermediate non-soiling member.

A fusing member according to this invention can be used in any imaging method using toner particles, e.g., electrophotography, direct electrostatic printing, ionography, magnetography, etc. A fusing member of this invention is particularly well suited in imaging method using dry toner particles with an average volume diameter between 2 and 20 $\mu$m.

A fusing member of the present invention can be used with printers wherein the final image receiving substrate is in sheet form as well as in printers wherein the final image receiving substrate is in web form. A fusing member of this invention can most beneficially be used in the latter printers.

Since a fusing member of this invention can be used both a fusing roller as well as transfusing member with very low amounts of external release agent, the invention also encompasses an imaging method comprising the steps of:

image-wise applying toner particles to a substrate and fixing said toner particles to said substrate, by simultaneous application of heat and pressure, in a fixing device with a fusing roller coupled to a pressure roller characterised in that:

said fusing roller comprises a support, and on said support, an outermost layer containing a silicone elastomer, with at most 5% by weight of filler particles, said elastomer layer having a swelling factor, SF, equal to or higher than 3 and a thickness between 5 and 500 $\mu$m, both limits included and a second layer with an impurity absorbing material, closer to said support and immediately in contact with said outermost layer, said second layer being at least 40 $\mu$m thick and that at most 320 mg/m$^2$ of a release agent is applied to the surface of said fusing roller.

It also encompasses an imaging method comprising the steps of —bringing a toner image on a transfuse member, transferring said toner image from said member to a final image receiving substrate, and fixing said image, characterised in that said transfusing member comprises a support, and on said support, an outermost layer containing a silicone elastomer, with at most 5% by weight of filler particles, said elastomer layer having a swelling factor, SF, equal to or higher than 3 and a thickness between 5 and 500 $\mu$m, both limits included and a second layer with an impurity absorbing material, closer to said support and immediately in contact with said outermost layer, said second layer being at least 40 $\mu$m thick and that at most 320 mg/m$^2$ of a release agent is applied to the surface of said transfusing member.

EXAMPLES

The fusing members are used in the examples as fusing rollers, to fuse, without applying any external release agent to the surface, commercially available CHROMAPRESS (trade name of Agfa-Gevaert NV, Mortsel Belgium) toner to 4CC-ART paper of 115 g/m2 (trade name of ENSO). A fixing window was determined by taking the temperature were fusing starts (the end of the cold offset) and the temperature at which hot offset sets on is determined after printing 100 sheets of paper in DIN A3 format and after printing 2000 sheets of paper in DIN A3 format, normal fixing proceeded at 145° C. The larger the value, the better, a fixing window after 2000 sheets of 15° C. is acceptable, a fixing window above 20° C. is good and a fixing window after 2000 sheets of 25° C. is very good. The printed sheets were covered for x % with toner particles. For examples 4, 8, 9, 10 and 11 the cold offset temperature after fixing 100 sheets is given in table 2. This temperature is a measure for the ease of fusing the toner particles, thus the lower the better.

The fusing members were also used in an experimental transfuse set-up. An electrostatic latent image was developed on a photoconductor by commercially available CHROMAPRESS (trade name of Agfa-Gevaert NV, Mortsel Belgium) toner, the developed image was transferred from there to a transfusing member with a construction according to this invention, and then further transferred to plain paper 4CC-ART paper of 115 g/m2 (trade name of ENSO). The transfusing member was heated and was used without any external release agent applied to its surface. A fixing window was determined by taking the temperature were fusing starts (the end of the cold offset) and the temperature at which hot offset sets on is determined after printing 100 sheets of paper in DIN A3 format and after printing 7200 sheets of paper in DIN A3 format, normal transfusing took place at 120° C. The larger the value, the better a fixing window after 7200 sheets of 10° C. is acceptable, a fixing window after 7200 sheets of 15° C. is good and a fixing window after 7200 sheets of 20° C. is very good. The results are given in table 1. The peel force in N/m was also determined according to Finat No 3, with Tape TESA 4163 at a peeling speed of 30 cm/min.

The Second Layer Closest to the Support

In comparative examples 1 to 2 and invention examples 1 to 6, the same second layer (closest to the support) was used. It was prepared by mixing 150 g of SLE5900 (trade name of general Electric, USA for a silicone rubber containing fine silica particles having specific surface>30 m2/g) part A and 150 g of SLE5900 part B are with 75 g of iso-octane 100. The solution was coated with a ring coater at a coating speed of 0.75 mm/s on the degreased surface of an aluminium cylinder with diameter 140 mm. The coating is hardened for 15 minutes at 165° C. This gave a second layer being 70 μm thick. The thermal conductivity of this second layer was 0.18 W/m.K.

Comparative Example 1 (CE1)

100 g of DMS-V22, trade name of ABCR, Karlsruhe, Germany, having a vinyl content of 0.21 milli-equivalent per g (meq/g) and a formula

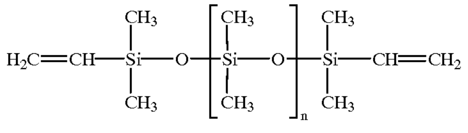

wherein $n = 124$ were mixed with 5.4 g of SILOPREN U VERNETZER 830, trade name of Bayer AG, Leverkusen, Germany, for an organopolysiloxane containing at least two hydrogen atoms direct bound to a Si-atom per molecule with formula

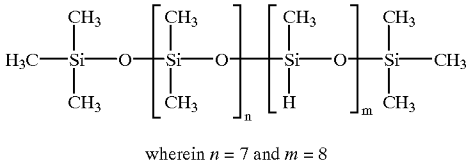

wherein $n = 7$ and $m = 8$ and with 0.43 g of a solution containing 2.27% of 1-ethynyl-1-cyclohexanol in iso-octane 100. To this mixture, 0.90 g of a solution, in 129 g of iso-octane 100, of 1 g SILOPREN U KATA PTS, trade name of Bayer AG, Leverkusen, Germany, for a complex of Pt-siloxane in 2-propanol, were added as catalyser. With this solution a self-supporting layer was prepared and the swelling factor, SF, was determined as described above and was 2.3. This solution was also coated on the second layer as described above with a ring-coater at 1.25 mm/s and reacted for 20 minutes at 165° C. This gave an uppermost layer with thickness of 55 μm.

Comparative Example 2 (CE2)

80 g of DMS-V25, trade name of ABCR Karlsruhe, Germany, having a vinyl content of 0.11 milli-equivalent per g (meq/g) and a formula

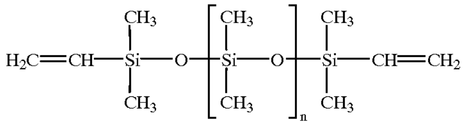

wherein $n = 230$ were mixed with 4.3 g of SILOPREN U VERNETZER 830, trade name of Bayer AG, Leverkusen, Germany, for an organopolysiloxane containing at least two hydrogen atoms direct bound to a Si-atom per molecule with formula

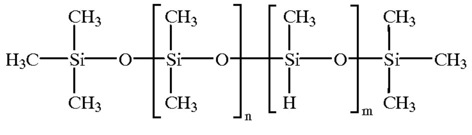

wherein $n = 7$ and $m = 8$ and with 0.33 g of a solution containing 2.27% of 1-ethynyl-1-cyclohexanol in iso-octane 100. To this mixture, 0.70 g of a solution, in 129 g of iso-octane 100, of 1 g SILOPREN U KATA PTS, trade name of Bayer AG, Leverkusen, Germany, for a complex of Pt-siloxane in 2-propanol, were added as catalyser. With this solution a self-supporting layer was prepared and the swelling factor, SF, was determined as described above and was 2.6. This solution was also coated on the second layer as described above with a ring- coater at 1.25 mm/s and reacted for 20 minutes at 165° C. This gave an uppermost layer with thickness of 35 μm.

Example 1 (E1)

100 g of DMS-V31, trade name of ABCR Karlsruhe, Germany ????, having a vinyl content of 0.07 milli-equivalent per g (meq/g) with formula

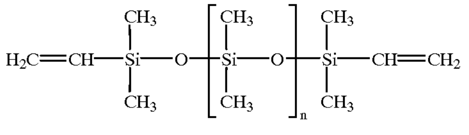

wherein $n = 376$ were mixed with 3.4 g of SILOPREN U VERNETZER 830, trade name of Bayer AG, Leverkusen, Germany, for an organopolysiloxane containing at least two hydrogen atoms direct bound to a Si-atom per molecule with formula

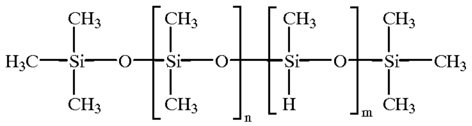

wherein *n* = 7 and *m* = 8 and with 0.42 g of a solution containing 2.27 of 1-ethynyl-1-cyclohexanol in iso-octane 100. To this mixture, 0.88 g of a solution, in 129 g of iso-octane 100, of 1 g SILOPREN U KATA PTS, trade name of Bayer AG, Leverkusen, Germany, for a complex of Pt-siloxane in 2-propanol, were added as catalyser. With this solution a self-supporting layer was prepared and the swelling factor, SF, was determined as described above and was 3.2. This solution was also coated on the second layer as described above with a ring-coater at 1.25 mm/s and reacted for 20 minutes at 165° C. This gave an uppermost layer with thickness of 35 μm.

Example 2 (E2)

40 g of DMS-V52, trade name of ABCR, Karlsruhe, Germany, having a vinyl content of 0.013 milli-equivalent per g (meq/g) with formula

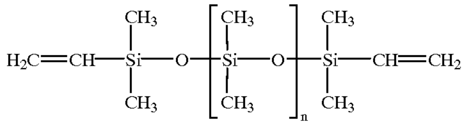

wherein *n* = 2092 were mixed with 40 g iso-octane 100 and 0.254 g of SILOPREN U VERNETZER 830, trade name of Bayer AG, Leverkusen, Germany, for an organopolysiloxane containing at least two hydrogen atoms direct bound to a Si-atom per molecule with formula

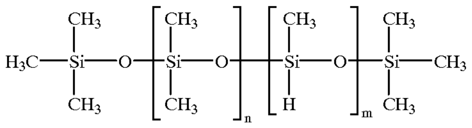

wherein *n* = 7 and *m* = 8 and with 0.16 g of a solution containing 2.27 of 1-ethynyl-1-cyclohexanol in iso-octane 100. To this mixture, 0.34 g of a solution, in 129 g of iso-octane 100, of 1 g SILOPREN U KATA PTS, trade name of Bayer AG, Leverkusen, Germany, for a complex of Pt-siloxane in 2-propanol, were added as catalyser. With this solution a self-supporting layer was prepared and the swelling factor, SF, was determined as described above and was 4.6. This solution was also coated on the second layer as described above with a ring-coater at 1.25 mm/s and reacted for 20 minutes at 165° C. This gave an uppermost layer with thickness of 50 μm.

Example 3 (E3)

60 g of DMS-V41, trade name of ABCR, Karlsruhe, Germany, having a vinyl content of 0.03 milli-equivalent per g (meq/g) with formula

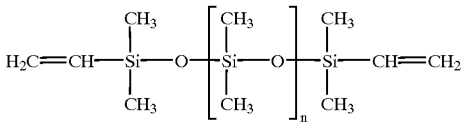

wherein *n* = 844 were mixed with 20 g iso-octane 100 and 0.88 g of SILOPREN U VERNETZER 830, trade name of Bayer AG, Leverkusen, Germany, for an organopolysiloxane containing at least two hydrogen atoms direct bound to a Si-atom per molecule with formula

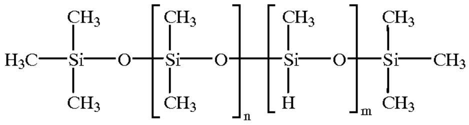

wherein *n* = 7 and *m* = 8 and with 0.25 g of a solution containing 2.27 of 1-ethynyl-1-cyclohexanol in iso-octane 100. To this mixture, 0.52 g of a solution, in 129 g of iso-octane 100, of 1 g SILOPREN U KATA PTS, trade name of Bayer AG, Leverkusen, Germany, for a complex of Pt-siloxane in 2-propanol, were added as catalyser. With this solution a self-supporting layer was prepared and the swelling factor, SF, was determined as described above and was 5.4. This solution was also coated on the second layer as described above with a ring-coater at 1.25 mm/s and reacted for 20 minutes at 165° C. This gave an uppermost layer with thickness of 35 μm.

Example 4 (E4)

20 g of VGM-021, trade name of ABCR Karlsruhe, Germany, having a vinyl content of 0.034 milli-equivalent per g (meq/g) with formula

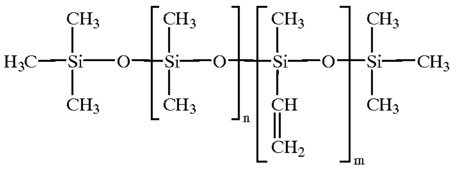

*n* = 6660 and *m* = 17 were mixed with 80 g iso-octane 100 and 0.076 g of SILCOLEASE CROSSLINKER 91A, trade name of Rhodia, France for an organopolysiloxane containing at least two hydrogen atoms direct bound to a Si-atom per molecule with formula

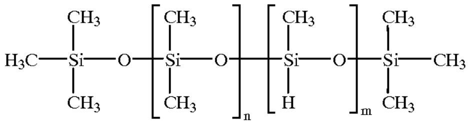

To this mixture 0.21 g of SILCOLEASE CATALYST 90B was added. With this solution a self-supporting layer was prepared and the swelling factor, SF, was determined as described above and was 5.4. This solution was also coated on the second layer as described above with a ring-coater at 1.25 mm/s and reacted for 20 minutes at 165° C. This gave an uppermost layer with thickness of 25 μm Example 5 (E5)

45 g of DMS-V46, trade name of ABCR, Karlsruhe, Germany, having a vinyl content of 0.018 milli-equivalent per g (meq/g) with formula

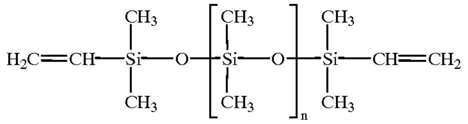

wherein $n = 1578$ were mixed with 35 g iso-octane 100 and 0.39 g of SILOPREN U VERNETZER 830, trade name of Bayer AG, Leverkusen, Germany, for an organopolysiloxane containing at least two hydrogen atoms direct bound to a Si-atom per molecule with formula

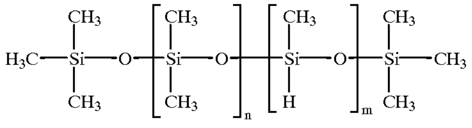

wherein $n = 7$ and $m = 8$ and with 0.18 g of a solution containing 2.27 of 1-ethynyl-1-cyclohexanol in iso-octane 100. To this mixture, 0.39 g of a solution, in 129 g of iso-octane 100, of 1 g SILOPREN U KATA PTS, trade name of Bayer AG, Leverkusen, Germany, for a complex of Pt-siloxane in 2-propanol, were added as catalyser. With this solution a self-supporting layer was prepared and the swelling factor, SF, was determined as described above and was 5.5. This solution was also coated on the second layer as described above with a ring-coater at 1.25 mm/s and reacted for 20 minutes at 165° C. This gave an uppermost layer with thickness of 35 μm.

Example 6

10 g of VGM-021, trade name of ABCR, Karlsruhe, Germany, having a vinyl content of 0.034 milli-equivalent per g (meq/g) with formula

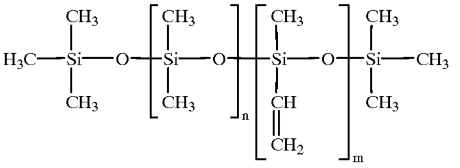

$n = 6660$ and $m = 17$ were mixed with 47 g iso-octane 100. To this mixture 3.33 g of DGM-000, trade name of ABCR for a high molecular weight silicone oil with formula

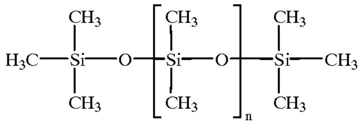

$n = 5150$ and 0.23 g of SILCOLEASE CROSSLINKER 91A, trade name of ??????? for an organopolysiloxane containing at least two hydrogen atoms direct bound to a Si-atom per molecule with formula

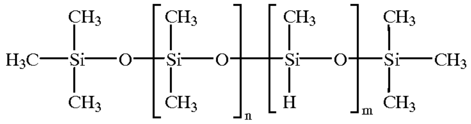

To this mixture 0.633 g of SILCOLEASE CATALYST 90B was added. With this solution a self-supporting layer was prepared and the swelling factor, SF, was determined as described above and was 11. This solution was also coated on the second layer as described above with a ring-coater at 1.25 mm/s and reacted for 20 minutes at 165° C. This gave an uppermost layer with thickness of 35 μm.

Example 7 (E7)

Example 4 was repeated except for the second layer. The second layer was prepared by mixing 60 g of SILCOSEAL RTV 201 containing silica having specific surface >30 m2/g, (trade name of General Electric) and 20 g cyclohexane. 6 g of VERNETZER A21 (trade name of Rhodia) was further added to the solution. This solution was coated with a ring coater at a coating speed of 0.75 mm/s on the degreased surface of an aluminium cylinder with diameter 140 mm. The coating is hardened for 60 minutes at 100° C. This gave a second layer being 100 μm thick. The thermal conductivity of this second layer was 0.18 W/m.K.

Example 8 (E8)

Example 4 was repeated except for the second layer. The second layer was prepared by mixing 100 g of TSE-3331A and 100 g of TSE-3331B containing carbon particles with, (trade names of General Electric). This solution was coated with a ring coater at a coating speed of 0.75 mm/s on the degreased surface of an aluminium cylinder with diameter 140 mm. The coating is hardened for 60 minutes at 100° C. This gave a second layer being 250 μm thick. The thermal conductivity of this second layer was 0.63 W/m.K.

TABLE 1

| Example | SF | meq/g | peel | W100F | W2000F | W100T | W7200T |
|---|---|---|---|---|---|---|---|
| CE1 | 2.3 | 0.21 | 1.40 | 45 | 5 | 30 | 2 |
| CE2 | 2.6 | 0.11 | 1.89 | 45 | 7 | 34 | 5 |
| E1 | 3.2 | 0.07 | 1.31 | 40 | 15 | | |
| E2 | 4.6 | 0.013 | 1.38 | 40 | 22 | 32 | 17 |
| E3 | 5.4 | 0.03 | 1.88 | 47 | 25 | 35 | 19 |
| E4 | 5.4 | 0.03 | 1.52 | 40 | 30 | 34 | 15 |
| E5 | 5.5 | 0.018 | 1.49 | 45 | 30 | 30 | 23 |

TABLE 1-continued

| Example | SF | meq/g | peel | W100F | W2000F | W100T | W7200T |
|---|---|---|---|---|---|---|---|
| E6 | 11 | 0.025 | ? | 45 | 25 | 32 | 11 |
| E7* | 5.4 | 0.034 | 1.57 | 40 | 17 | 34 | 13 |
| E8* | 5.4 | 0.034 | 1.58 | 45 | 5 | 30 | 11 |

SF: Swelling factor
meq/g: milli-equivalent vinyl groups in the organopolysiloxane
peel: peel force in N/m according to Finat No 3, with Tape TESA 4163 at a peeling speed of 30 cm/min
W100F in ° C.: fixing window after 100 sheets with fusing member used in a fixing device
W200F in ° C.: fixing window after 2000 sheets with fusing member used in a fixing device W100F in ° C.: fixing window after 100 sheets with fusing member used in a transfusing device
W7200T in ° C.: fixing window after 7200 sheets with fusing member used in a transfusing device
E7 and E8: outermost layer the same as in example 4 (E4) but with different second layer.

It is clear that the fixing window are better when the top layer has a higher swelling factor. When the second layer comprises silica as filler (E1–E7), the fixing windows are wider than when carbon particles are used as filler in the second layer (E8).

The thermal conductivity of the second layer is quite important for allowing rapid fixing at fairly low temperatures, as indicated by the following examples.

Example 9 (E9)

Example 4 was repeated except for the second layer. The second layer was prepared by mixing 90 g of TSE-389 containing fine silica particles having specific surface >30 m2/g, (trade name of General Electric) and 10 g cyclohexane. This solution was coated with a ring coater at a coating speed of 0.75 mm/s on the degreased surface of an aluminium cylinder with diameter 140 mm. The coating is hardened for 15 minutes at 165° C. This gave a second layer being 100 $\mu$m thick. The thermal conductivity of this second layer was 0.18 W/m.K.

Example 10 (E10)

Example 4 was repeated except for the second layer. The second layer was prepared by mixing 40 g of TSE-326 containing a metal oxide having a diameter larger than 1 $\mu$m. (trade name of General Electric) and 10 g cyclohexane. This solution was coated with a ring coater at a coating speed of 0.75 mm/s on the degreased surface of an aluminium cylinder with diameter 140 mm. The coating is hardened for 15 minutes at 165° C. This gave a second layer being 50 $\mu$m thick. The thermal conductivity of this second layer was 0.43 W/m.K.

Example 11 (E11)

Example 4 was repeated except for the second layer. The second layer was prepared by mixing 142.5 g of TSE-3280G containing a metal oxide having a diameter larger than 1 $\mu$m, (trade name of General Electric) and 7.5 g cyclohexane. This solution was coated with a ring coater at a coating speed of 0.75 mm/s on the degreased surface of an aluminium cylinder with diameter 140 mm. The coating is hardened for 15 minutes at 165° C. This gave a second layer being 50 $\mu$m thick. The thermal conductivity of this second layer was 0.88 W/m.K.

In table 2 the results regarding cold-offset and fixing window obtained with fusing member with different fillers are given. Example 4 and example 8 are repeated in this table.

TABLE 2

| Example | Thermal conduc W/m.K | Cold offset 100 | W2000F |
|---|---|---|---|
| E4 | 0.18 | 138° C. | 30° C. |
| E9 | 0.18 | 135° C. | 30° C. |
| E10 | 0.43 | 125° C. | 17° C. |
| E8 | 0.63 | 130° C. | 5° C. |
| E11 | 0.88 | 125° C. | 18° C. |

It is clear that the ease of fusing, measured by a lower cold offset temperature, becomes better as the thermal conductivity of the second layer becomes higher with an acceptable to good fixing window. Surprisingly, a fusing member wherein the second layer is filled with carbon (E8) did, although it showed a relatively high thermal conductivity, not show as low a cold offset temperature as E10 and E11, wherein the second layer contained oxides with diameter higher than 1 $\mu$m and did certainly not show an acceptable fixing window.

What is claimed is:

1. A fusing member comprising a support, and on said support, an outermost layer containing a silicone elastomer, with at most 5% by weight of filler particles said elastomer layer having a swelling factor, SF, equal to or higher than 3 and a thickness between 5 and 500 $\mu$m, both limits included and a second layer with an impurity absorbing material, closer to said support and immediately in contact with said outermost layer, said second layer being at least 40 $\mu$m thick and containing a silicone containing elastomer and at least 5% by weight of metal oxide particles having a specific surface area of $\geqq 30\ m^2/g$.

2. A fusing member according to claim 1, wherein said metal oxide particles are a member selected from the group consisting of $SiO_2$, $TiO_2$ and $Al_2O_3$.

3. A fusing member according to claim 2, wherein said outermost layer has a peel force, measured being according to Finat No 3, with Tape TESA 4163 at a peeling speed of 30 cm/min equal to or lower than 5 N/m.

4. A fusing member according to claim 2, wherein said silicone elastomer in said outermost layer is based on an organopolysiloxane with free alkenyl groups and a alkenyl content between 0.005 milli-equivalent/g and 0.1 milli-equivalent/g, both limits included.

5. A fusing member according to claim 4, wherein said alkenyl groups are vinyl groups.

6. A fusing member according to claim 4, wherein said organopolysiloxane is a member selected from the group consisting of

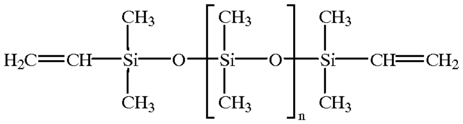

with $20 \leq n \leq 7{,}000$

-continued

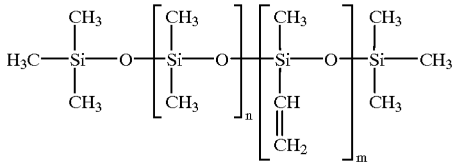

with $20 \leq n \leq 20{,}000$

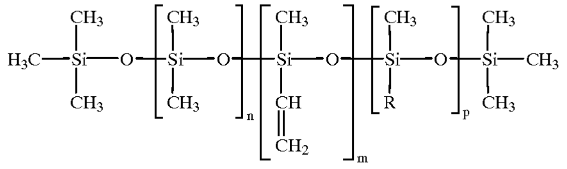

with $20 \leq n \leq 20{,}000$
$2 \leq m \leq 2{,}000$
$1 \leq p \leq 10{,}000$

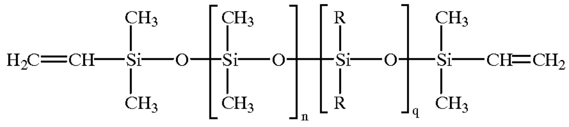

with $20 \leq n \leq 7{,}000$
$1 \leq q \leq 5{,}000$ wherein, R=alkyl or aryl group, preferably methyl, ethyl, 3,3,3-trifluorpropyl and phenyl.

7. A fusing member according to claim 2, wherein said silicone elastomer in said outermost layer is based on a mixture of organopolysiloxanes with free alkenyl groups and wherein said mixture has an average alkenyl content between 0.005 milli-equivalent/g and 0.1 milli-equivalent/g, both limits included.

8. A fusing member according to claim 7, wherein said alkenyl groups are vinyl groups.

9. A fusing member according to claim 7, wherein said mixture of organopolysiloxanes comprises a member selected from the group consisting of

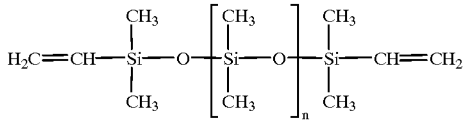

with $20 \leq n \leq 7{,}000$

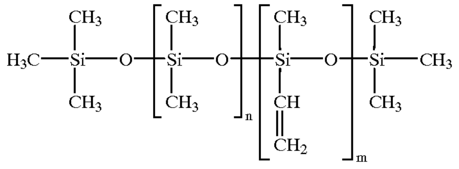

with $20 \leq n \leq 20{,}000$

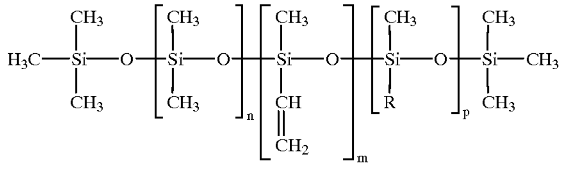

with $20 \leq n \leq 20{,}000$
$2 \leq m \leq 2{,}000$
$1 \leq p \leq 10{,}000$

-continued

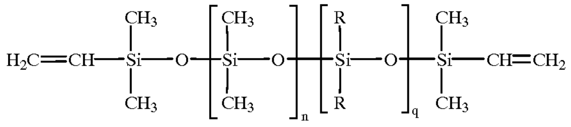

with $20 \leq n \leq 7{,}000$
$1 \leq q \leq 5{,}000$ wherein, R=alkyl or aryl group, preferably methyl, ethyl, 3,3,3-trifluorpropyl and phenyl.

10. A fusing member according to claim 2, wherein said outermost layer further comprises an organopolysiloxane containing, per molecule, at least two hydrogen atoms directly bound to a Si-atom.

11. A fusing member according to claim 10, wherein said outermost layer further comprises in the bulk a silicone oil with weight average molecular weight≧50,000.

12. A fusing member according to claim 1, wherein said outermost layer has a peel force, measured being according to Finat No 3, with Tape TESA 4163 at a peeling speed of 30 cm/min equal to or lower than 5 N/m.

13. A fusing member according to claim 1, wherein said silicone elastomer in said outermost layer is based on an organopolysiloxane with free alkenyl groups and a alkenyl content between 0.005 milli-equivalent/g and 0.1 milli-equivalent/g, both limits included.

14. A fusing member according to claim 13, wherein said alkenyl groups are vinyl groups.

15. A fusing member according to claim 13, wherein said organopolysiloxane is a member selected from the group consisting of

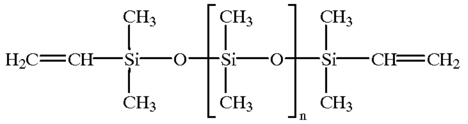

with $20 \leq n \leq 7{,}000$

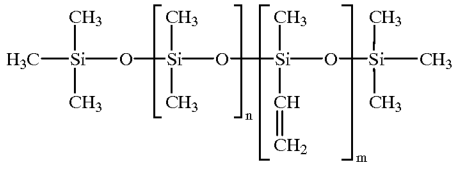

with $20 \leq n \leq 20{,}000$

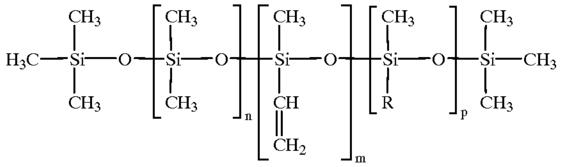

with $20 \leq n \leq 20{,}000$
$2 \leq m \leq 2{,}000$
$1 \leq p \leq 10{,}000$

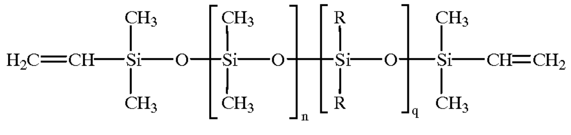

with $20 \leq n \leq 7{,}000$
$1 \leq q \leq 5{,}000$ wherein, R=alkyl or aryl group, preferably methyl, ethyl, 3,3,3-trifluorpropyl and phenyl.

16. A fusing member according to claim 1, wherein said silicone elastomer in said outermost layer is based on a mixture of organopolysiloxanes with free alkenyl groups and wherein said mixture has an average alkenyl content between 0.005 milli-equivalent/g and 0.1 milli-equivalent/g, both limits included.

17. A fusing member according to claim 16, wherein said alkenyl groups are vinyl groups.

18. A fusing member according to claim 16, wherein said mixture of organopolysiloxanes comprises a member selected from the group consisting of

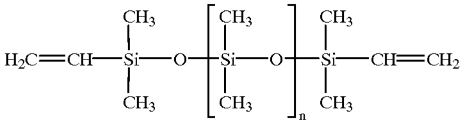

with $20 \leq n \leq 7{,}000$

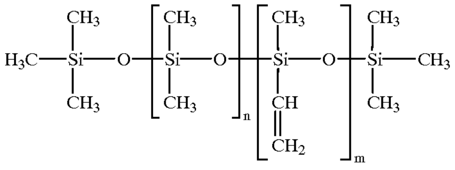

with $20 \leq n \leq 20{,}000$

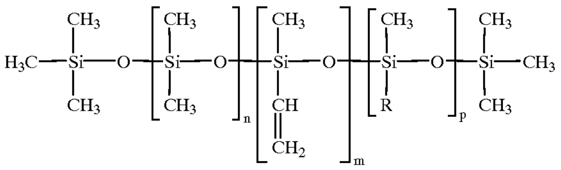

with $20 \leq n \leq 20{,}000$
$2 \leq m \leq 2{,}000$
$1 \leq p \leq 10{,}000$

-continued

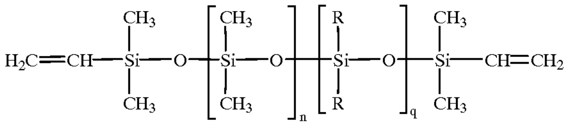

with $20 \leq n \leq 7{,}000$
$1 \leq q \leq 5{,}000$ wherein, R=alkyl or aryl group, preferably methyl, ethyl, 3,3,3-trifluorpropyl and phenyl.

19. A fusing member according to claim 1, wherein said outermost layer further comprises an organopolysiloxane containing, per molecule, at least two hydrogen atoms directly bound to a Si-atom.

20. A fusing member according to claim 19, wherein said outermost layer further comprises in the bulk a silicone oil with weight average molecular weight≧50,000.

21. A fusing member according to claim 1, wherein said second layer has a thermal conductivity≧0.4 W/m.K.

22. A fusing member according to claim 2, wherein said second layer has a thermal conductivity≧0.4 W/m.K.

* * * * *